United States Patent [19]

Shiratori

[11] Patent Number: 5,581,318
[45] Date of Patent: Dec. 3, 1996

[54] VIEWFINDER UNIT IN A CAMERA

[75] Inventor: Kazutoshi Shiratori, Hino, Japan

[73] Assignee: Olympus Optical Co., Ltd., Tokyo, Japan

[21] Appl. No.: 276,994

[22] Filed: Jul. 19, 1994

[30] Foreign Application Priority Data

Jul. 30, 1993 [JP] Japan ................................ 5-190505

[51] Int. Cl.$^6$ ............................ G03B 13/02; G03B 17/00
[52] U.S. Cl. ......................... 396/296; 396/384; 396/386
[58] Field of Search ...................... 354/70, 219, 289.1, 354/409, 430

[56] References Cited

U.S. PATENT DOCUMENTS

| | | | |
|---|---|---|---|
| 4,465,355 | 8/1984 | Murakami et al. | 354/475 |
| 4,519,685 | 5/1985 | Momiyama et al. | 354/154 |
| 5,019,854 | 5/1991 | Mukai et al. | 354/471 |
| 5,170,204 | 12/1992 | Mukai et al. | 354/409 |
| 5,245,375 | 9/1993 | Ohshita | 354/219 |

*Primary Examiner*—Michael L. Gellner
*Assistant Examiner*—Eddie C. Lee
*Attorney, Agent, or Firm*—Louis Weinstein

[57] ABSTRACT

A viewfinder unit in a camera has a viewfinder objective optical system that contributes to formation of an object image. The camera viewfinder unit comprises an inversion optical system composed of a first prism and a second prism both providing an object image formed in the vicinity of a field mask by a viewfinder objective optical system in the form of a correct image and then guiding the object image to an eyepiece lens, a center of a first reflector plane of the second prism associated with a center of a viewfinder field and a periphery of the first reflector plane thereof associated with an outside of the viewfinder field, each of which is made by coating the first reflector plane with a translucent half mirror, and an LCD located at a position dependent on the first reflector plane of the second prism, which is optically equivalent to a position of image formation in a viewfinder objective optical system, opposed to the center and periphery of the first reflector surface, and designed to display viewfinder information.

22 Claims, 2 Drawing Sheets

VIEWFINDER UNIT IN A CAMERA

BACKGROUND OF THE INVENTION

1. Field of the Invention

The present invention relates to a viewfinder unit in a camera, and more particularly, to a viewfinder unit in a camera having a viewfinder objective optical system that contributes to formation of an object image.

2. Description of the Related Art

In the past, various proposals have been made for a viewfinder unit in a camera having a viewfinder objective optical system that contributes to formation of an object image.

An example of such a viewfinder unit proposed in, for example, Japanese Patent Application No.5-84920 includes a real-image viewfinder comprising an objective lens, a first prism for forming an intermediate image provided by the objective lens in the vicinity of an emission end plane on which a range finding range setting frame is engraved, a picture size setting frame, a second prism, and an eyepiece lens which are arranged in that order along the optical axis. An auxiliary prism is then joined with a first reflector plane of the second prism. The center of the joint plane is formed as a half mirror, and the periphery thereof is formed as a total reflection mirror. Thus, various optical indications are superimposed on an image.

The viewfinder unit described in the Japanese Patent Application No.5-84920 has the advantage of superimposing an indication on the center of a viewfinder field without causing the whole field to get dark. However, no consideration is taken into display of FIG. 1 of other extra-field indications.

Another example of the viewfinder unit in a camera disclosed in Japanese Patent Laid-Open No.4-174419 includes a viewfinder optical system comprising an objective lens, a field frame and field lens both arranged in the vicinity of a real-image plane of the objective lens, an eyepiece lens for use in observing an object image formed on the real-image plane by the objective lens, and a prism being interposed between the field frame and eyepiece lens and having a reflector plane. Herein, a transparent surface is formed as part of the reflector plane of the prism so as to be perpendicular to the axis of reflected light. An information display image is displayed by transmitting it through the transparent surface.

The viewfinder described in the Japanese Patent Laid-Open No.4-174419 is useful for extra-field display but cannot superimpose an indication on the center of a viewfinder field. Moreover, it is hard to machine a glass prism, because the prism must be shaped uniquely.

OBJECTS AND SUMMARY OF THE INVENTION

The first object of the present invention is to provide a viewfinder unit in a camera enabling a display to be provided.

The second object of the present invention is to provide a viewfinder unit in a camera enabling a display to be provided inside and outside a viewfinder field.

The third object of the present invention is to provide a viewfinder unit in a camera enabling a display to be provided and permitting a bright viewfinder field.

The fourth object of the present invention is to provide a viewfinder unit in a camera enabling a display to be provided inside and outside a viewfinder field and permitting a bright viewfinder field.

The fifth object of the present invention is to provide a small-sized viewfinder unit in a camera enabling a display to be provided.

The sixth object of the present invention is to provide a small-sized viewfinder unit in a camera enabling a display to be provided at low cost.

The seventh object of the present invention is to provide a small-sized viewfinder unit in a camera offering a bright viewfinder field and enabling a display to be provided in the center of the viewfinder field and a display to be provided in areas other than the viewfinder field with ease at low cost.

The eighth object of the present invention is to provide a viewfinder unit in a camera realizing saving of power consumption.

The ninth object of the present invention is to provide a small-sized viewfinder unit in a camera obviating the necessity of an optical system for taking in external light and enabling display.

The tenth object of the present invention is to provide a viewfinder unit in a small-sized camera serving as an infrared active type range finding means or as part of a display means.

The eleventh object of the present invention is to provide a lightweight viewfinder unit in a camera enabling a display to be provided.

The twelfth object of the present invention is to provide a viewfinder unit in a camera obviating the necessity of a tall viewfinder and a tall camera and enabling display which would otherwise result therefrom.

Briefly, the present invention relates to a viewfinder unit in a camera comprising an information display means having a display pattern appearing in the inside of a viewfinder field and a display pattern appearing in the outside of the viewfinder field, and an optical superimposing means for superimposing a display image provided by the information display means on a field image provided by a viewfinder optical system.

These as well as other objects and advantages of the present invention will become further apparent from the detailed description below.

DETAILED DESCRIPTION OF THE PREFERRED EMBODIMENTS

An embodiment of the present invention will be described with reference to the appended drawings.

Figure 1:
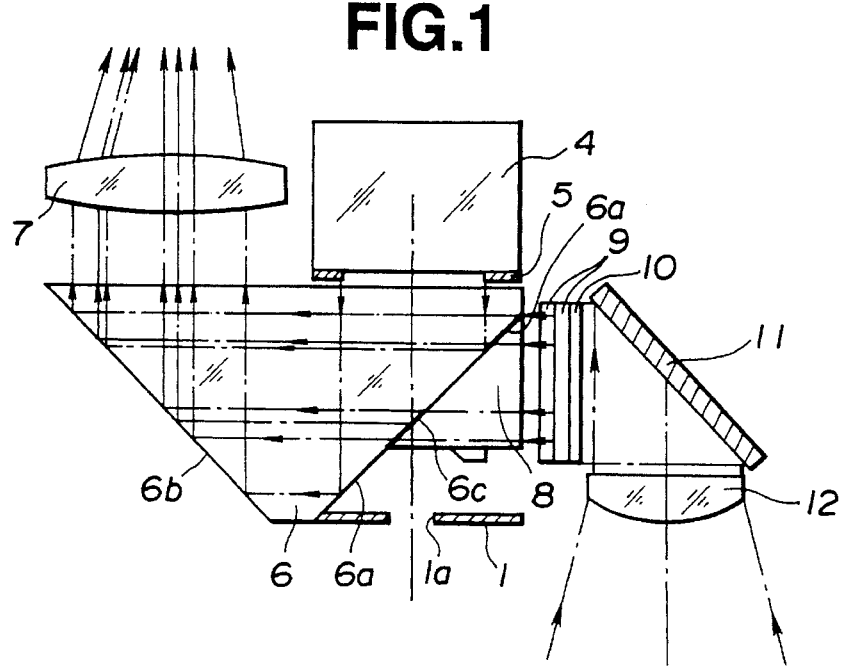
FIG. 1 is a plan view showing a viewfinder unit in a camera of one embodiment of the present invention.
Figure 2:
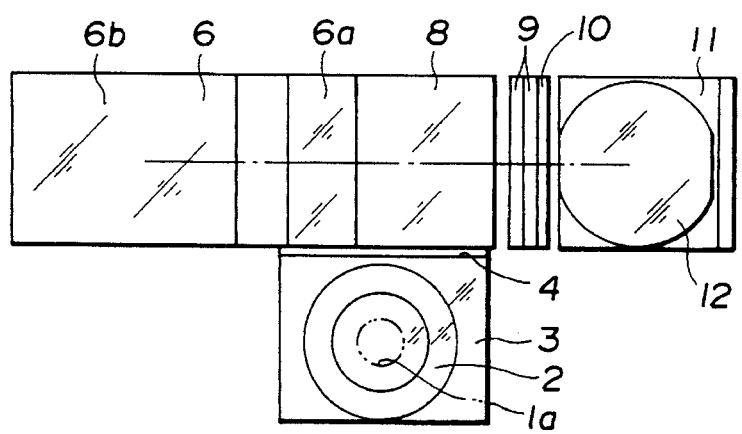
FIG. 2 is a front view showing the viewfinder unit of the embodiment.
Figure 3:
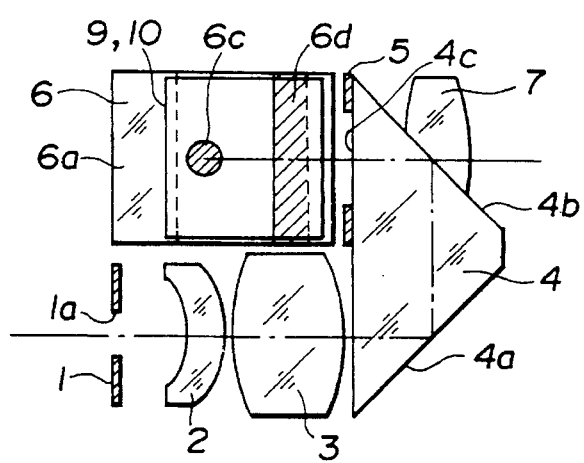
FIG. 3 is a right side view showing the viewfinder unit of the embodiment of FIG. 1.

FIGS. 1 to 3 show an embodiment of the present invention.

An aperture diaphragm 1 is located at the front end of a viewfinder. Rays having been reflected from an object and passing through an aperture 1a of the aperture diaphragm 1 pass through objective lenses 2 and 3, and then enter a first prism 4 serving as an inversion optical system. The object image is reflected upward by a first reflector plane 4a of the first prism 4 and then forward by a second reflector plane 4b thereof. The object image is then formed in the vicinity of a field mask 5 located near an emission end plane 4c of the first prism 4.

The object image is further reflected leftward in FIG. 1 by a first reflector plane 6a of a second prism 6 constituting an inversion optical system and then backward by a second reflector plane 6b thereof. The object image is then observed by a photographer through an eyepiece lens 7.

At this time, the image provided by the objective lenses is inverted vertically by the first prism 4 and then laterally by the second prism 6.

The first reflector plane 6a of the second prism 6 has both a center 6c thereof associated with a center of a viewfinder field and a periphery 6d thereof coated to function as a half mirror. The other portions of the first reflector plane 6a are coated to function as a total reflection mirror.

The half mirror coating of the first reflector plane 6a is produced as follows: the center 6c and periphery 6d of the first reflector plane are masked, aluminium or the like is deposited on the first reflector plane 6a, the center 6c and periphery 6d of the first reflector plane are unmasked, and then the whole of the first reflector plane 6a is coated to function as a half mirror.

The first reflector plane 6a of the second prism 6 is joined with an auxiliary prism 8. The auxiliary prism 8 is shaped substantially like a right-angled triangle pole, i.e. a prism having a cross-sectional shape of a right triangle, and has a plane thereof containing an oblique line joined with the first reflector plane 6a.

An LCD 9 serving as an information display means is located in the vicinity of a position dependent on the first reflector plane 6a of the second prism 6, which is equivalent to the location of an image formation plane near the field mask 5, on the right hand of the auxiliary prism 8 in FIG. 1.

Figure 4:
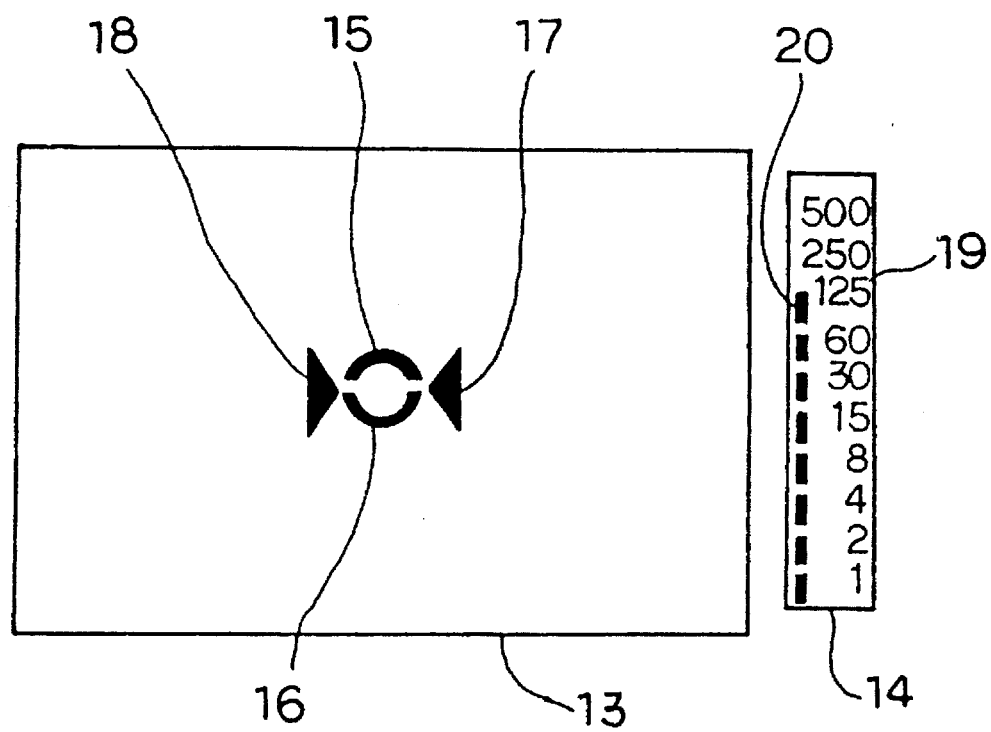
FIG. 4 is a view showing a pattern that the LCD employed in FIG. 1 superimposes on the viewfinder.

The LCD 9 has a display pattern, as shown in FIG. 4 to be superimposed on the center of a viewfinder field associated with the center 6c of the first reflector plane of the second prism 6, for example, an in-focus indication or a range finding range indication, and a display pattern to be displayed in the outside of the viewfinder field associated with the periphery 6d of the first reflector plane thereof, for example, a shutter speed indication or a stroboscopic photography indication.

Approximately in the central portion of a viewfinder fields frame 13, a vertical pair of field central portion display patterns 15 and 16 forming a circular arc are visually and recognizably displayed (FIG. 4). On the right and left sides of these field central portion display patterns 15 and 16, approximate triangle display patterns 17 and 18 are visually and recognizably displayed.

Also, for example, on the right side of the outside the viewfinder field frame 13, a field outside display frame 14 is visually and recognizably displayed. For example, letter display 19 showing a selectably shutter speed and a scale pattern 20 showing a shutter speed currently being selected are visually and recognizably displayed.

These display patterns on the LCD 9 are turned on or off by an LCD drive circuit, which is not shown, connected to the LCD 9, and thus switched between transparent and opaque states.

A diffusion plate 10 is arranged on the plane of the LCD 9 on the opposite side of the auxiliary prism 8. External light taken in through a light intake lens 12 is reflected by a mirror 11, and then diffused by the diffusion plate 10. The diffused light illuminates the LCD 9.

The images of the display patterns on the illuminated LCD 9 are transmitted by the auxiliary prism 8 and the center 6c and periphery 6d of the first reflector plane, passed by the second prism 6 and eyepiece lens 7, and then observed together with an object image by a photographer.

The center of a viewfinder field defined by the field mask 5 and observed via the eyepiece lens 7 gets slightly dark because the center 6c of the first reflector plane is formed as a half mirror. The dark area is a mere part of the viewfinder field. The whole viewfinder field provides a bright object image for observation.

In the right area of the outside of the viewfinder field, an extra-viewfinder field display pattern is observed after passing through the periphery 6d of the first reflector plane formed as a half mirror. The periphery 6d of the first reflector plane is located closely to the image formation plane coincident with the field mask 5. Even if the periphery 6d is positioned considerably closely to the right end of the field frame, rays propagating through the viewfinder field will not be vignetted nor do any other adverse effects occur. The extra-viewfinder field display pattern on the LCD is therefore not separated too greatly from an object image present in the viewfinder field but is well discernible.

The periphery 6d of the first reflector plane formed as a half mirror and associated with the outside of the viewfinder field may be a mere transparent surface. In this case, the first reflector plane is coated with a half mirror with the periphery 6d thereof masked. As a result, the center 6c of the first reflector plane is formed as a half mirror, the periphery 6d thereof is made transparent, and the other portions thereof are formed as a total reflection mirror.

The light intake lens 12 and mirror 11 are employed as means for illuminating the LCD 9. When the mirror 11 is realized with a dichroic mirror that transmits infrared rays, if an infrared emitting member is placed behind the dichroic mirror (on the opposite side of the light intake lens 12), the light intake lens 12 can also serve as a light projection lens or a light receiving lens for use in infrared active type range finding. This results in a smaller-sized camera.

Furthermore, the LCD may be illuminated using an artificial illuminating means such as an LED instead of natural light. Alternatively, natural light and artificial illumination may be used selectively: when an environment is bright, natural light is used; and when the environment is dark, artificial illumination is used. This leads to saving of power required for artificial illumination.

In the embodiment described herein, an LCD is employed as a display device. Needless to say, a self-emission type display device such as an LED may be employed. This obviates the necessity of an optical system for taking in external light, and results in a smaller-sized viewfinder in a camera.

A combination of two prisms is employed as an inversion optical system in a viewfinder. Alternatively, mirrors may be used to constitute a similar inversion optical system. In this case, a thin mirror is used to form a reflector plane comparable to the first reflector plane 6a. The thin mirror is then coated with half mirrors serving as the center 6c and periphery 6d of the first reflector plane. This obviates the necessity of the auxiliary prism 8 and results in a lightweight viewfinder in a camera.

The orientations of reflector planes in an inversion optical system and the layout thereof are not limited to those described in conjunction with the embodiment. For example, an image may be inverted laterally and then vertically.

Half mirrors for passing indications may be formed on another reflector plane in an inversion optical system. In this case, if a display device is located at a position equivalent to a plane on which an object image is formed, indications can be observed as mentioned above.

As described so far, according to the embodiment, a sole display device such as an LCD is needed to superimpose an indication on the center of a viewfinder field and display viewfinder information in the outside of the viewfinder field without deterioration of the brightness of the whole of the viewfinder field. This results in a small-sized and low-cost viewfinder in a camera.

Furthermore, when prisms constitute an inversion optical system, the depth of a second prism should be increased a bit. However, a viewfinder itself need not be made taller. This is advantageous in that the height of a camera is not increased.

In the present invention, it will be apparent that a wide range of different working modes can be formed on the basis of this invention without departing from the spirit and scope of the invention. This invention is not restricted to any specific embodiment but limited only by the appended claims.

What is claimed is:

1. A viewfinder unit in a camera, comprising:
   a real-image viewfinder formed with an optical system independently of a photographing lens array;
   an inversion optical system having a plurality of reflector planes and lying in said real-image viewfinder;
   said inversion optical system further including one reflector plane having half mirror portions thereof respectively associated with a center of a viewfinder field and a region outside of the viewfinder field; and
   an information display means located at a position optically equivalent to a position of image formation in said viewfinder optical system and opposed to said one reflector plane;
   whereby light emanating from said information display means is transmitted through said one reflector plane so that information is displayed in said center of said viewfinder field and in a region outside of the viewfinder field.

2. A viewfinder unit in a camera according to claim 1, wherein said information display means is a liquid crystal display (LCD) means.

3. A viewfinder unit in a camera according to claim 1, wherein said one reflector plane is a first reflector plane to receive rays from an image formation plane directed toward an eyepiece lens.

4. A viewfinder unit in a camera according to claim 1, wherein said inversion optical system comprises first and second prisms, said reflector planes forming part of said first and second prisms; and
   a reflector plane of one of said first and second prisms being said partly transparent reflector plane.

5. A viewfinder unit in a camera according to claim 4, further including a third prism arranged between said information display means and said one reflector plane for transmitting information from said information display means to said viewfinder.

6. A viewfinder unit in a camera, comprising:
   a single information display means having a display pattern appearing inside a viewfinder field and a display pattern appearing outside the viewfinder field;
   an optical superimposing means for superimposing a display image provided by said information display means on a field image provided by a viewfinder optical system said optical superimposing means includes means which function as a half mirror; and
   said means which functions as a half mirror having half mirror portions for passing light from said information display means to regions inside and outside of said viewfinder field.

7. A viewfinder unit in a camera, comprising:
   a single information display means having a display pattern appearing inside a viewfinder field and a display pattern appearing outside the viewfinder field;
   an optical superimposing means for superimposing a display image provided by said information display means on a field image provided by a viewfinder optical system said optical superimposing means includes means which function as a half mirror; and
   said viewfinder optical system being a real-image viewfinder;
   said half mirror having a portion thereof positioned to pass light from said information display means.

8. A viewfinder unit in a camera, comprising:
   a single information display means having a display pattern appearing inside a viewfinder field and a display pattern appearing outside the viewfinder field;
   an optical superimposing means for superimposing a display image provided by said information display means on a field image provided by a viewfinder optical system said optical superimposing means includes means which function as a half mirror; and
   said optical superimposing means being a half mirror portion arranged to pass light representing a display pattern so as to appear adjacent to and outside a viewfinder field.

9. A viewfinder unit in a camera, comprising:
   a single information display means having a display pattern appearing inside a viewfinder field and a display pattern appearing outside the viewfinder field;
   an optical superimposing means for superimposing a display image provided by said information display means on a field image provided by a viewfinder optical system said optical superimposing means includes means which function as a half mirror; and
   said half mirror being positioned to pass light to a region inside a viewfinder field.

10. A viewfinder unit in a camera, comprising:
    a first information display means for showing a display pattern inside of a viewfinder field;
    a second information display means for showing a display pattern outside of a viewfinder field;
    an inversion optical system constituting part of a viewfinder optical system; and
    said inversion optical system including a reflector plane having a first portion for passing light emanating from said first information display means to a central region of said viewfinder field and a second portion for passing light emanating from said second information display means to a region adjacent to and outside of said viewfinder field.

11. A viewfinder unit in a camera according to claim 10, wherein at least one of said first and second information display means is a liquid crystal display (LCD) means.

12. A viewfinder unit in a camera, comprising:

a viewfinder objective optical system contributing to formation of an object image;

an inversion optical system having a plurality of reflector planes, and reflecting an object image passing through said viewfinder objective optical system a plurality of times to provide said object image in the form of a correct image and then guiding said object image to an eyepiece lens;

a first partly reflective surface formed on at least one of said plurality of reflector planes and associated with a first predetermined portion of said viewfinder field;

a second partly reflective surface formed on at least one of said plurality of reflector planes and associated with a second predetermined portion of said viewfinder field; and an information display means located at a position optically equivalent to said viewfinder objective optical system, opposed to said first and second partly reflective surfaces, and designed to superimpose information on a predetermined area inside and outside of said viewfinder field by transmitting information light through said partly transparent reflector surfaces.

13. A viewfinder unit in a camera according to claim 12, wherein said inversion optical system includes a first prism means for inverting 180° an object image passing through said viewfinder objective optical system and a second prism means for inverting 180° an object image so as to guide the object image to said eyepiece lens.

14. A viewfinder unit in a camera according to claim 12, further comprising an illuminating means for illuminating said first and second information display means to transmit light through said partly reflective surfaces and thus superimposing said light on a light beam passing through said viewfinder objective optical system.

15. A viewfinder unit in a camera according to claim 14, wherein said illuminating means is an external light intake means provided independently of said viewfinder objective optical system.

16. A viewfinder unit in a camera according to claim 15, wherein said external light intake means includes light intake lens and a mirror for reflecting taken-in-light toward said party reflective surfaces.

17. A viewfinder unit in a camera according to claim 15, wherein said external light intake means includes a light intake lens and a dichroic mirror for transmitting infrared rays entering said intake means.

18. A viewfinder unit in a camera according to claim 17, wherein an infrared projecting/receiving means is located on a side opposite said light intake lens with respect to said dichroic mirror, and said external light intake means also serves as an infrared active type range finding means.

19. A viewfinder unit in a camera according to claim 12, wherein at least one of said first and second information display means is a liquid crystal means or a self-emission type display device.

20. A viewfinder unit in a camera according to claim 19, wherein said liquid crystal means is illuminated by an external light intake means or an LED which is provided independently of said viewfinder objective optical system.

21. A viewfinder unit in a camera having a viewfinder objective optical system that contributes to formation of an object image, comprising:

an inversion optical system having a plurality of reflector planes, and reflecting an object image passing through said viewfinder objective optical system a plurality of times to provide said object image in the form of a correct image and then guiding said object image to an eyepiece lens;

an information display means lying outside an optical path in said inversion optical system and displaying information in an inside or outside of a viewfinder field; and a superimposing means for optically superimposing information provided by said information display means on an image provided by said inversion optical system, said superimposing means being one of said reflector planes which includes means for reflecting light from an object striking one side of said one reflector plane and for passing light striking regions on an opposite side of said one reflector plane through a common surface between said one side and said opposite side.

22. A viewfinder unit in a camera according to claim 21, wherein said one of said plurality of reflector planes has a half mirror reflector surface thereof associated with a predetermined area in of at least one of a portion inside of said viewfinder field and a portion outside of and adjacent to said viewfinder field, and said information display means is located at a position optically equivalent to said viewfinder objective optical system and opposed to said one reflector plane.

* * * * *